(12) United States Patent
Chen et al.

(10) Patent No.: US 8,395,825 B2
(45) Date of Patent: Mar. 12, 2013

(54) IMAGE SCANNER AND METHOD FOR COMPENSATING IMAGE DATA

(75) Inventors: Chih-Ping Chen, Taipei (TW); Chiung-Sheng Wang, Taipei (TW); Yu-Hsien Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 1774 days.

(21) Appl. No.: 11/246,343

(22) Filed: Oct. 7, 2005

(65) Prior Publication Data

US 2007/0058213 A1    Mar. 15, 2007

(30) Foreign Application Priority Data

Sep. 9, 2005  (TW) .............................. 94131044 A

(51) Int. Cl.
*H04N 1/04* (2006.01)
(52) U.S. Cl. ......... 358/474; 358/488; 358/1.9; 358/497; 358/496; 358/504; 358/509; 358/445; 358/446; 358/475; 358/520; 358/537; 382/274; 382/275; 348/221.1; 348/229.1
(58) Field of Classification Search ......................... None
See application file for complete search history.

(56) References Cited

U.S. PATENT DOCUMENTS

| | | | |
|---|---|---|---|
| 5,822,052 A * | 10/1998 | Tsai .............................. | 356/229 |
| 6,552,829 B1 * | 4/2003 | Maciey et al. ................. | 358/509 |
| 6,952,284 B2 * | 10/2005 | Andrews et al. ............... | 358/1.5 |
| 7,016,550 B2 * | 3/2006 | Alderson et al. .............. | 382/274 |
| 7,062,091 B2 * | 6/2006 | Brown et al. .................. | 382/195 |
| 7,688,479 B2 * | 3/2010 | Huang et al. .................. | 358/474 |
| 7,733,519 B2 * | 6/2010 | Feng et al. ..................... | 358/1.6 |
| 2002/0003908 A1 * | 1/2002 | Kijima et al. ................. | 382/274 |
| 2002/0021456 A1 * | 2/2002 | Toriyama ....................... | 358/446 |
| 2002/0054712 A1 * | 5/2002 | Sun ............................... | 382/274 |
| 2002/0140996 A1 * | 10/2002 | Spears et al. .................. | 358/504 |
| 2003/0025948 A1 * | 2/2003 | Huang et al. .................. | 358/474 |
| 2004/0047007 A1 * | 3/2004 | Kanno ........................... | 358/474 |
| 2004/0057082 A1 * | 3/2004 | Liu ................................ | 358/406 |
| 2004/0196477 A1 * | 10/2004 | Breen et al. ................... | 358/1.9 |
| 2005/0134937 A1 * | 6/2005 | Cholewo et al. .............. | 358/461 |
| 2005/0219363 A1 * | 10/2005 | Kohler et al. ................. | 348/187 |
| 2006/0291007 A1 * | 12/2006 | Huang et al. .................. | 358/474 |
| 2007/0260419 A1 * | 11/2007 | Hagiwara ...................... | 702/150 |

OTHER PUBLICATIONS

Chang-Yung Feng et al., U.S. Appl. No. 11/124,974, filed May 9, 2005.

* cited by examiner

*Primary Examiner* — Vincent Rudolph
*Assistant Examiner* — Pawandeep Dhingra
(74) *Attorney, Agent, or Firm* — Tracy M. Heims; Apex Juris, pllc

(57) ABSTRACT

An image scanner and a method for compensating image data are provided. By using both the X-axis calibration gain and the Y-axis calibration gain, the processing time period for compensating image data is reduced. In addition, no initial calibration and no warm-up calibration are required.

9 Claims, 4 Drawing Sheets

IMAGE SCANNER AND METHOD FOR COMPENSATING IMAGE DATA

FIELD OF THE INVENTION

The present invention relates to an image scanner and a method for compensating image data, and more particularly to an image scanner and a method for compensating image data by using both the X-axis calibration gain and the Y-axis calibration gain.

BACKGROUND OF THE INVENTION

Image scanners are commonly used in offices or homes for scanning objects such as documents, photographs or films.

Due to the some factors such as fabrication errors, uneven luminance of the lamp tube and the warm-up time period of the scanner, it is necessary to compensate the image data. As known, the uneven luminance of the lamp tube means that the luminance at both ends of the lamp tube is lower than that at the middle portion of the lamp tube. There are two conventional methods for compensating image data. The first compensating method involves in an initial calibration when the scanner is actuated. Whereas, the second compensating method relates to a no warm-up scanning operation. The operation principles of these two compensating methods will be illustrated as follows.

According to the initial calibration method, an elongated white plate is scanned to obtain a reference value. Referring to FIG. 1, a schematic top view of a white plate to be used for the initial calibration is illustrated. The white plate 100 is attached onto an edge of a scanning platform 1000 where an object to be scanned is placed thereon. In addition, the length direction of the elongated white plate 100 is perpendicular to the scanning direction A of the image scanner. That is, the elongated white plate 100 is oriented in the X-axis direction of the scanning platform 1000.

Once the luminance of the lamp tube reaches the stable state, in response to a calibrating command, the scanner begins to scan the white plate 100. Under this circumstance, the control program installed in the scanner will perform a computation on the image data of the white plate 100, thereby obtaining an X-axis calibration gain and an offset value required for compensating the image data.

The X-axis calibration gain is stored in a shading table of the image scanner. For compensation, the image data of the scanned object is multiplied by the X-axis calibration gain and the offset value is also incorporated.

The second compensating method is intended to compensate the error resulted from a reduced warm-up time of the scanner.

Referring to FIG. 2, a plot of the luminance variation of a lamp tube is illustrated. As shown in FIG. 2, the luminance of the lamp tube approaches stable after the image scanner has been turned on for a certain time period t. This time period t is referred to the warm-up time period. If a scanning operation is performed before the luminance of the lamp tube reaches the stable state, undesirable errors of the scanned image data are generated. Accordingly, for most scanners, a sufficient warm-up time period is necessary in order to achieve accurate image data.

The warm-up time period for a typical image scanner is about 30 to 90 seconds, which is time-consuming. Recently, scanning, off-line copying and printing functions are integrated into the multi-function peripheral (MFP). In addition to the warm-up time period required for performing the scanning operation, the user needs to wait for such a time period after the copy button is depressed down. This waiting time reduces the copying efficient.

Therefore, it is important to develop a method for performing the scanning operation without waiting for the warm-up time period. Some scanning methods with no warm-up time period were disclosed. For example, a compensation method comprises the steps of performing the scanning operation when the luminance of a lamp tube is unstable and then compensating the scanned image data. Such a compensation method was disclosed in a co-pending U.S. patent application Ser. No. 11/124,974, entitled "Compensation method of digital image data", which was filed by the same assignee of the present application on May 9, 2005, and the contents of which are hereby incorporated by reference.

According to the U.S. patent application Ser. No. 11/124,974, since two compensating computations on the image data for the same scan line are necessary to perform the X-axis and Y-axis compensations, the time period for processing the image data is not sufficiently small.

In views of the above-described disadvantages resulted from the conventional method, the applicant keeps on carving unflaggingly to develop a compensation method with reduced processing time period according to the present invention through wholehearted experience and research.

SUMMARY OF THE INVENTION

It is an object of the present invention to provide an image scanner and a method for compensating image data by using both the X-axis calibration gain and the Y-axis calibration gain, thereby reducing the processing time period for compensating image data.

In accordance with a first aspect of the present invention, there is provided an image scanner for generating image data of a scanned object. The image scanner comprises a lamp tube, an image sensor, an analog front-end unit, a gain computing module and a control and digital computation unit. The lamp tube serves as a light source to emit light onto the scanned object. The image sensor is used for producing analog signals of the image of the scanned object. By using the analog front-end unit, the analog signals of the image are converted into digital image data. The gain computing module is used for generating an X-axis calibration gain to compensate the error resulted from uneven luminance of the lamp tube, generating a Y-axis calibration gain to compensate the error resulted from the unstable luminance of the lamp tube, and generating a XY-axis calibration gain according to the X-axis calibration gain and the Y-axis calibration gain. The control and digital computation unit compensates the digital image data with the XY-axis calibration gain.

Preferably, the gain computing module is a program.

In an embodiment, the X-axis calibration gain is obtained by the steps of (a) discriminating whether the luminance of the lamp tube is stable; (b) scanning an X-axis white plate when the luminance of the lamp tube is stable; and (c) obtaining the X-axis calibration gain according to the luminance value of the scanned X-axis white plate.

In an embodiment, the Y-axis calibration gain is obtained by the steps of (a) averaging the luminance values of the Y-axis white plate for plural scan lines to obtain an average luminance value $D_N$; and (b) obtaining the Y-axis calibration gain $D_Y$ according to a target luminance value $D_T$ and the average luminance value $D_N$, where $D_N \times D_Y = D_T$.

In accordance with a second aspect of the present invention, there is provided a method for compensating image data from an image scanner. The image scanner comprises a lamp tube and a shading table for recording an X-axis calibration gain to compensate the error resulted from uneven luminance of the lamp tube. Firstly, a Y-axis calibration gain is obtained according to a target luminance value and an average luminance value of a Y-axis white plate for plural scan lines. Then, a XY-axis calibration gain is generated according to the X-axis calibration gain and the Y-axis calibration gain. The XY-axis calibration gain is then stored in the shading table. Afterward, image data of a scanned object for the plural scan lines are compensated with the XY-axis calibration gain.

In accordance with a third aspect of the present invention, there is provided a method for compensating image data from an image scanner. The image scanner comprises a lamp tube. Firstly, an X-axis calibration gain is generated to compensate the error resulted from uneven luminance of the lamp tube. Then, a Y-axis calibration gain is generated to compensate the error resulted from the unstable luminance of the lamp tube. According to the X-axis calibration gain and the Y-axis calibration gain, a XY-axis calibration gain. Afterward, digital image data of a scanned object is compensated with the XY-axis calibration gain.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
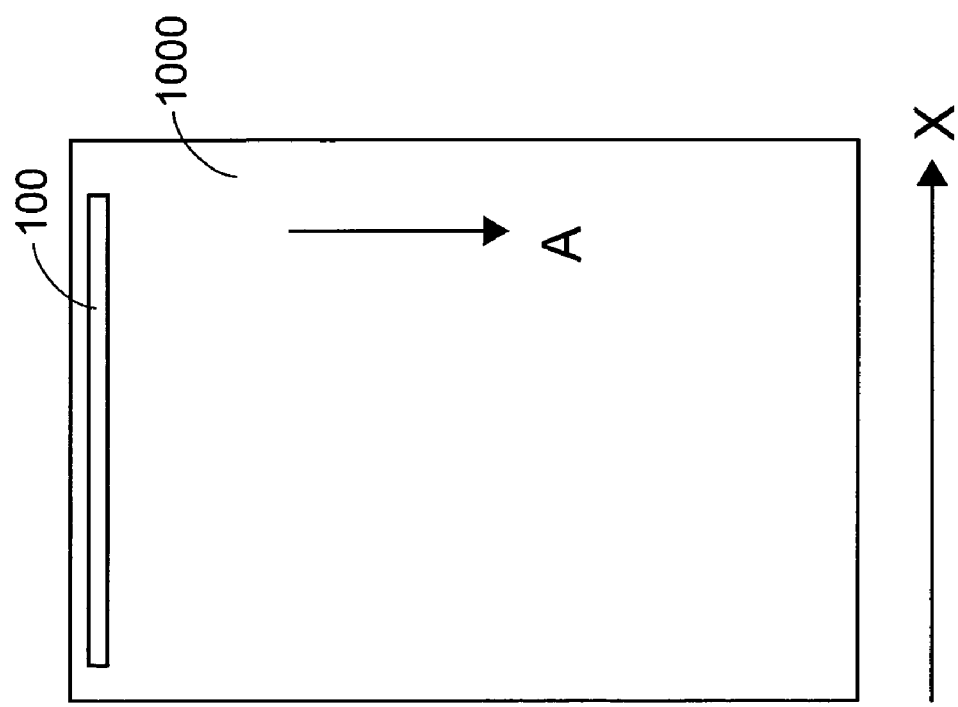
FIG. 1 is a schematic top view illustrating a white plate to be used for the initial calibration.
Figure 2:
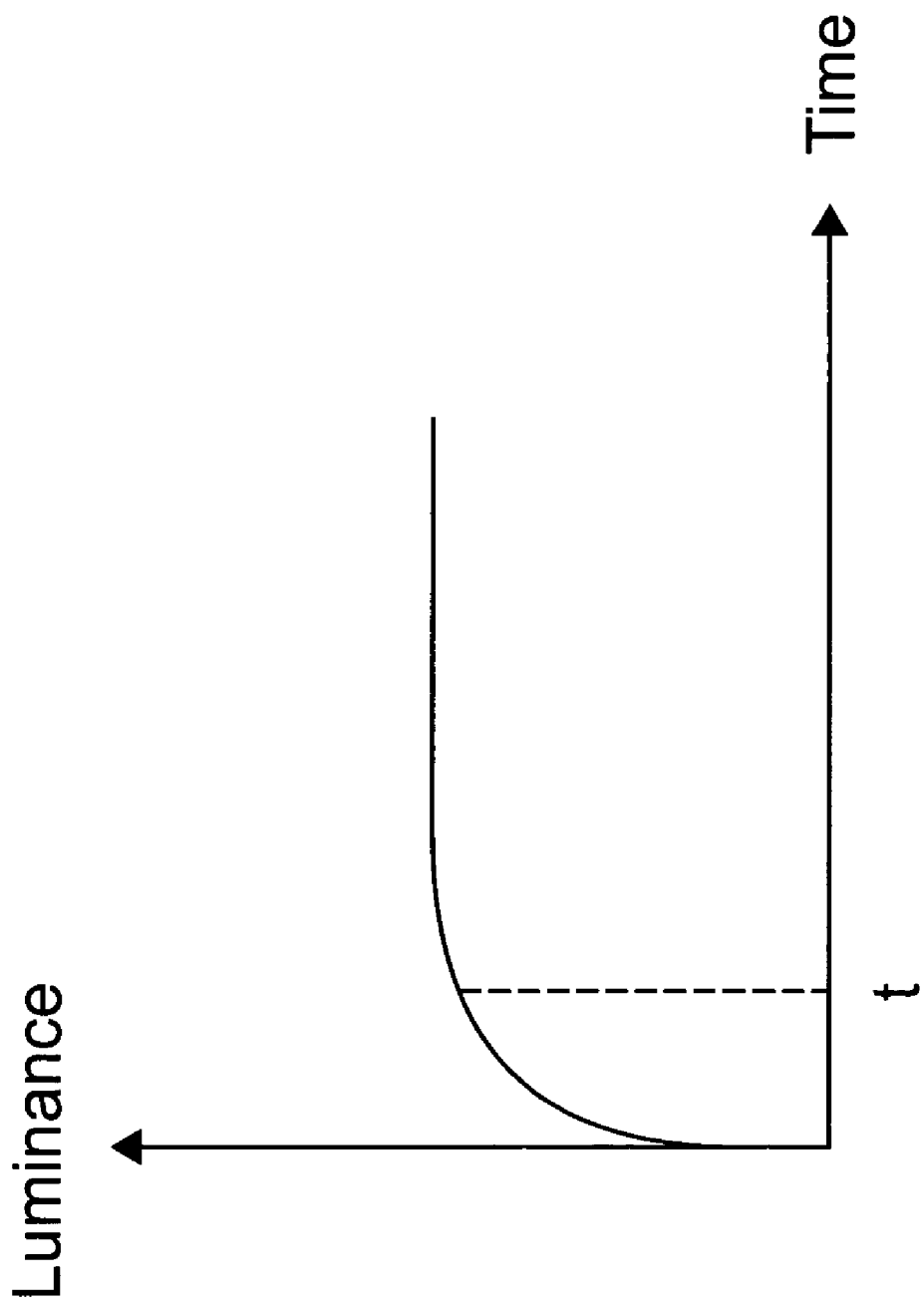
FIG. 2 is a plot illustrating the luminance variation of a lamp tube.
Figure 3:
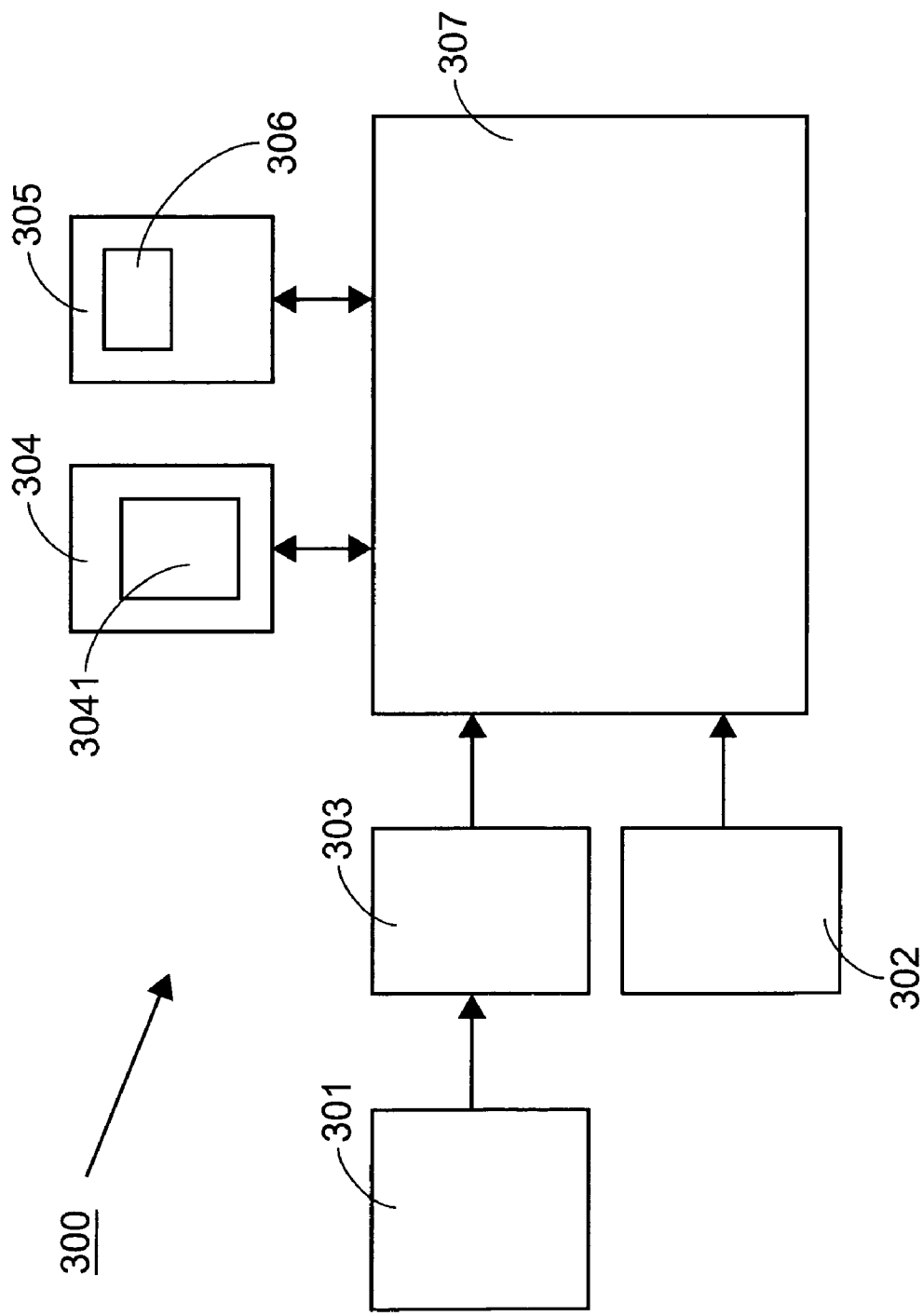
FIG. 3 is a functional block diagram of an image scanner according to a preferred embodiment of the present invention.

Referring to FIG. 3, a functional block diagram of an image scanner according to a preferred embodiment of the present invention is shown. It is to be noted that the following descriptions of the preferred embodiment of this invention are presented herein for purpose of illustration and description only. For purposes of clarity, only some essential components are shown in the drawings.

The image scanner 300 of FIG. 3 comprises an image sensor 301, a lamp tube 302, an analog front-end unit 303, a flash memory 304, a memory unit 305, a gain computing module 306, and a control and digital computation unit 307. The image sensor 301 is employed for producing analog signals of the image of the scanned object such as a document, a photograph or a film. The lamp tube 302 serves as a light source for emitting light, which is projected on the scanned object. By means of the analog front-end unit 303, the analog signals of the image are converted into the digital image data. A shading table 3041 has been previously stored in the flash memory 304. An exemplary gain computing module 306 is executed via a program stored in the memory unit 305 such as a synchronous dynamic random access memory (SDRAM). By means of the gain computing module 306, an X-axis calibration gain and a Y-axis calibration gain are generated. The X-axis calibration gain is used for compensating the error resulted from the uneven luminance of the lamp tube 302. By using the Y-axis calibration gain, the error resulted from the unstable luminance of the lamp tube would be compensated. Moreover, a XY-axis calibration gain is obtained from a computation of the X-axis calibration gain and the Y-axis calibration gain. According to the program of the gain computing module 306 and the XY-axis calibration gain, the control and digital computation unit 307 will compensate the digital image data.

Figure 4:
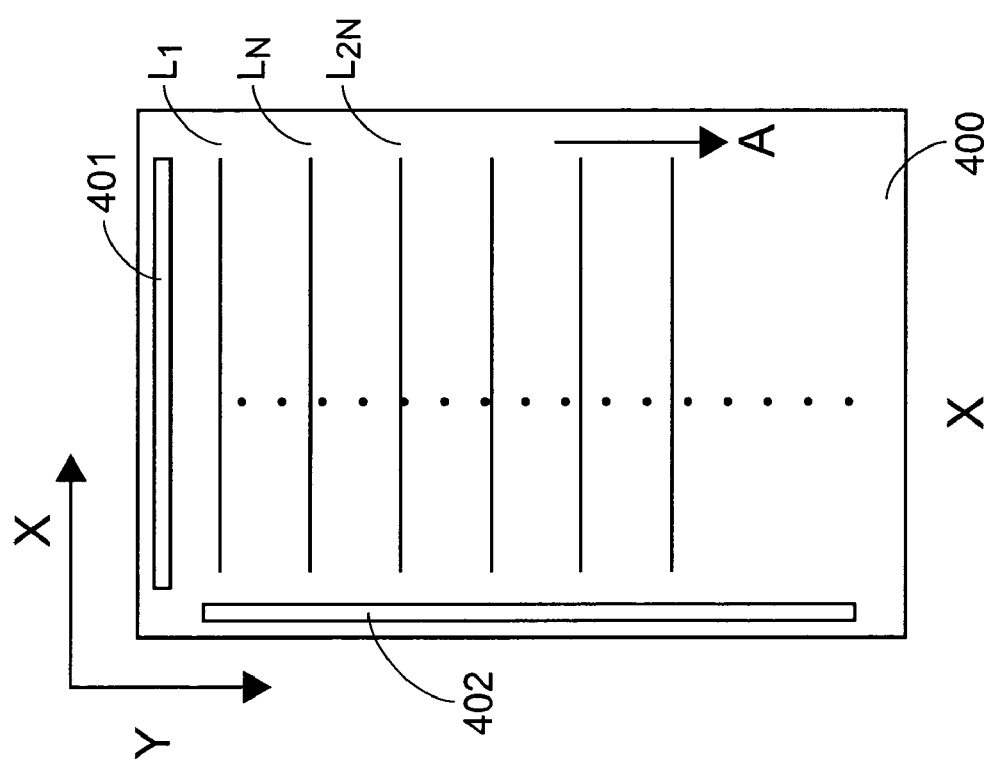
FIG. 4 is a schematic view illustrating an X-axis white plate and a Y-axis white plate arranged on the image scanner of the present invention.

Referring to FIG. 4, an X-axis white plate and a Y-axis white plate are illustrated. The X-axis white plate 401 is arranged on a scanning platform 400 and the length direction thereof is oriented in the X-axis direction of the scanning platform 400. The Y-axis white plate 402 is also arranged on a scanning platform 400 but the length direction thereof is oriented in the Y-axis direction of the scanning platform 400. The scanning direction A of the image scanner is parallel to the Y-axis direction and perpendicular to the X-axis direction. As shown in FIG. 4, there are plural scan lines of the scanned object. For neat drawings, however, only the scan lines $L_1$-$L_{2N}$ are indicated in the drawing. The symbols $L_1$, $L_N$ and $L_{2N}$ indicate the first, the Nth and the 2Nth scan lines, respectively.

The image data compensating method of the present invention will be described as follows in more details. This compensating method is implemented in the control and digital computation unit 307 according to the program of the gain computing module 306, and includes the procedures of generating the X-axis calibration gain, generating the Y-axis calibration gain and generating the XY-axis calibration gain.

For a purpose of generating the X-axis calibration gain, whether the luminance of the lamp tube 302 reaches the stable state is firstly discriminated (Step a). Once the luminance of the lamp tube 302 reaches the stable state, the X-axis white plate 401 is scanned by the sensor 301 (Step b). Then, the image data from the scanned X-axis white plate 401 are computed, thereby obtaining the X-axis calibration gain $G_X$ (Step c). Afterward, the X-axis calibration gain $G_X$ is written into the shading table 3041 of the flash memory 304 (Step d). The process for generating and computing the X-axis calibration gain is known to those in the art, and is not to be redundantly described herein.

Conventionally, the process for generating and computing the X-axis calibration gain is implemented before the user performs the scanning operation according to prior art. According to the present invention, however, the workers of the production line may previously compute the X-axis calibration gain during fabrication of the image scanner. That is to say, the scanner has a preset X-axis calibration gain $G_X$ stored in the shading table thereof. Consequently, the initial calibration procedure, which is usually performed after the scanner is turned on, would be exempted.

For a purpose of generating the Y-axis calibration gain and the XY-axis calibration gain, the luminance values of the image data of the Y-axis white plate 402 and the scanned object for the scan lines $L_1$-$L_N$ (i.e. the first to the Nth scan line) are successively received, wherein N is any plural number such as 16 or 32 (Step a). Then, the luminance values of the image data of the Y-axis white plate 402 for the scan lines $L_1$-$L_N$ are averaged to give the average luminance value $D_{L1-LN}$ (Step b). According to the average luminance value $D_{L1-LN}$ and a target luminance value DT which has been previously stored in the scanner, a first Y-axis calibration gain $G_{Y1}$ is calculated by the formula $D_{L1-LN} \times G_{Y1} = D_T$, wherein the target luminance value DT is the luminance value of the Y-axis white plate 402 obtained in the stable state of the lamp tube (Step c). After the first Y-axis calibration gain $G_{Y1}$ is multiplied by the X-axis calibration gain $G_X$, a first XY-axis calibration gain $G_{XY1}$ is obtained (Step d). Meanwhile, the preset X-axis calibration gain $G_X$, which is stored in the shading table 3041, is replaced with the first XY-axis calibration gain $G_{XY1}$ (Step e). After the luminance values of the scanned object for the scan lines $L_1$-$L_N$ are compensated with the first XY-axis calibration gain $G_{XY1}$, respectively, the compensated luminance values of the image data are obtained (Step f). Then, the luminance values of the image data of the Y-axis white plate 402 and the scanned object for the next N scan lines, i.e. the (N+1)th to the 2Nth scan lines $L_{N+1}$-$L_{2N}$, are successively received (Step g). Then, the luminance values of the image data of the Y-axis white plate 402 for the scan lines $L_{N+1}$-$L_{2N}$ are averaged to give the average luminance value $D_{LN+1-L2N}$ (Step h). According to the average luminance value $D_{LN+1-L2N}$ and the target luminance value DT, a second Y-axis calibration gain GY2 is calculated by the formula $D_{LN+1-L2N} \times G_{Y2} = D_T$ (Step i). After the second Y-axis calibration gain $G_{Y2}$ is multiplied by the first XY-axis calibration gain $G_{XY1}$, a second XY-axis calibration gain $G_{XY2}$ is obtained (Step j). Meanwhile, the first XY-axis calibration gain $G_{XY1}$, which has been stored in the shading table 3041, is replaced with the second XY-axis calibration gain $G_{XY2}$ (Step k). Afterward, the luminance values of the scanned object for the scan lines $L_{N+1}$-$L_{2N}$ are compensated with the second XY-axis calibration gain $G_{XY2}$, respectively, thereby obtaining the compensated luminance values of the image data (Step 1). The steps g-l are repeated (Step m) until the compensating process is terminated.

From the above description, the program of the gain computing module combines the X-axis calibration gain and the Y-axis calibration gain as the XY-axis calibration gain, which is stored in the shading table. Since only the compensating computation associated with the XY-axis calibration gain is required to achieve the X-axis compensation (initial calibration) and Y-axis compensation (no warm-up calibration), the processing time period for compensating image data is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner for generating image data of a scanned object, said image scanner comprising:
    a lamp tube serving as a light source to emit light onto said scanned object;
    an image sensor for producing analog signals of the image of said scanned object;
    an X-axis white plate arranged on a scanning platform;
    a Y-axis white plate arranged on said scanning platform;
    an analog front-end unit for converting said analog signals of the image into digital image data;
    a gain computing module for
        generating an X-axis calibration gain to compensate for any error resulted from uneven luminance of said lamp tube, wherein said X-axis calibration gain is stored in a shading table,
        generating a Y-axis calibration gain to compensate for any error resulted from the unstable luminance of said lamp tube,
        generating an XY-axis calibration gain according to said X-axis calibration gain and said Y-axis calibration gain, wherein said Y-axis calibration gain is multiplied by said X-axis calibration gain to generate said XY-axis calibration gain, and
        replacing said X-axis calibration gain in said shading table with said XY-axis calibration gain; and
    a control and digital computation unit for compensating said digital image data with said XY-axis calibration gain in order to reduce processing time.

2. The image scanner according to claim 1 wherein said gain computing module is a program.

3. The image scanner according to claim 1 wherein said X-axis calibration gain is obtained by the steps of:
    (a) discriminating whether the luminance of said lamp tube is stable;
    (b) scanning said X-axis white plate when the luminance of said lamp tube is stable; and
    (c) obtaining said X-axis calibration gain according to the luminance value of said scanned X-axis white plate.

4. The image scanner according to claim 1 wherein said Y-axis calibration gain is obtained by the steps of:
    (a) averaging the luminance values of said Y-axis white plate for plural scan lines to obtain an average luminance value $D_N$; and
    (b) obtaining said Y-axis calibration gain $D_y$ according to a target luminance value $D_T$ and said average luminance value $D_N$, where $D_N \times D_y = D_T$.

5. A method for compensating image data from an image scanner, said image scanner comprising a lamp tube and a shading table for recording an X-axis calibration gain to compensate the error resulted from uneven luminance of said lamp tube, said method comprising steps of:
    obtaining a Y-axis calibration gain according to a target luminance value and an average luminance value of a Y-axis white plate for plural scan lines;
    generating an XY-axis calibration gain according to said X-axis calibration gain and said Y-axis calibration gain, wherein said Y-axis calibration gain is multiplied by said X-axis calibration gain to generate said XY-axis calibration gain;
    replacing said X-axis calibration gain with said XY-axis calibration gain in said shading table;
    compensating image data of a scanned object for set plural scan lines with said XY-axis calibration gain in order to reduce processing time.

6. A method for compensating image data from an image scanner, said image scanner comprising a lamp tube, said method comprising steps of:
    generating an X-axis calibration gain to compensate the error resulted from uneven luminance of said lamp tube;
    generating a Y-axis calibration gain to compensate the error resulted from the unstable luminance of said lamp tube;
    generating a XY-axis calibration gain according to said X-axis calibration gain and said Y-axis calibration gain, wherein said Y-axis calibration gain is multiplied by said X-axis calibration gain to generate said XY-axis calibration gain; and
    compensating digital image data of a scanned object with said XY-axis calibration gain in order to reduce processing time.

7. The method according to claim 6 wherein the method is implemented by a program.

8. The method according to claim 7 wherein said X-axis calibration gain is obtained by the steps of:
    (a) discriminating whether the luminance of said lamp tube is stable;
    (b) scanning an X-axis white plate when the luminance of said lamp tube is stable; and
    (c) obtaining said X-axis calibration gain according to the luminance value of said scanned X-axis white plate.

9. The method of according to claim 7 wherein said Y-axis calibration gain is obtained by the steps of:
(a) averaging the luminance values of said Y-axis white plate for plural scan lines to obtain an average luminance value; and
(b) obtaining said Y-axis calibration gain $D_y$ according to a target luminance value $D_T$ and said average luminance value $D_N$, where $D_N \times D_y = D_T$.

* * * * *